(12) United States Patent
Esser et al.

(10) Patent No.: US 7,673,990 B2
(45) Date of Patent: Mar. 9, 2010

(54) INDIVIDUAL EYEGLASS LENS

(75) Inventors: Gregor Esser, Munich (DE); Helmut Altheimer, Baisweil-Lauchdorf (DE); Norbert Awrath, Munich (DE); Jochen Brosig, Gruenwald (DE); Walter Haimerl, Munich (DE); Winfried Nikolaus, Haar (DE); Kerstin Schmid, Fuerstenfeldbruck (DE); Edda Wehner, Enmering (DE); Andrea Welk, Munich (DE); Martin Zimmermann, Erdweg-Kleinberghofen (DE)

(73) Assignee: Rodenstock GmbH, Munich (DE)

( * ) Notice: Subject to any disclaimer, the term of this patent is extended or adjusted under 35 U.S.C. 154(b) by 270 days.

(21) Appl. No.: 10/577,035

(22) PCT Filed: Oct. 22, 2004

(86) PCT No.: PCT/EP2004/011983

§ 371 (c)(1),
(2), (4) Date: May 2, 2007

(87) PCT Pub. No.: WO2005/040893

PCT Pub. Date: May 6, 2005

(65) Prior Publication Data

US 2007/0279587 A1    Dec. 6, 2007

(30) Foreign Application Priority Data

Oct. 23, 2003    (DE) ................................ 103 49 721

(51) Int. Cl.
*G02C 7/06* (2006.01)

(52) U.S. Cl. ......................... 351/169; 351/164; 351/168
(58) Field of Classification Search ................... 351/169
See application file for complete search history.

(56) References Cited

U.S. PATENT DOCUMENTS 4,315,673 A * 2/1982 Guilino et al. ............... 351/169
4,426,139 A    1/1984 Van Ligten et al.

(Continued)

FOREIGN PATENT DOCUMENTS

EP        0 911 672 A1    4/1999
WO    WO 01/88601 A1    11/2001

OTHER PUBLICATIONS

European Office Action dated Aug. 23, 2006 (five (5) pages).

(Continued)

*Primary Examiner*—Jessica T Stultz
(74) *Attorney, Agent, or Firm*—Crowell & Moring LLP

(57) ABSTRACT

An individual eyeglass lens in which the vertical distance from the near reference point to the far distance point amounts to max. 18 millimeters, the progressive length is max. 14 millimeters, the main progressive length is max. 10 millimeters and the increase in refractive index, starting from the effect of the eyeglass lens at the far reference point up to a point 2 millimeters below the centering point amounts to less than 10% of the addition. The progressive length corresponds essentially to the vertical distance between the far reference point and a point essentially on the main line at which, starting from the far reference point, the value of the effect of the eyeglass lens corresponding the first time essentially to the near value.

7 Claims, 10 Drawing Sheets

U.S. PATENT DOCUMENTS

| | | | | |
|---|---|---|---|---|
| 5,272,495 | A | * | 12/1993 | Pedrono .................. 351/169 |
| 5,805,265 | A | * | 9/1998 | Umeda .................. 351/169 |
| 6,155,681 | A | | 12/2000 | Kris et al. |
| 6,220,705 | B1 | * | 4/2001 | Francois et al. ............ 351/169 |
| 6,382,790 | B1 | * | 5/2002 | Girod .................... 351/177 |
| 6,595,637 | B2 | | 7/2003 | Ahsbahs et al. |
| 6,652,096 | B1 | * | 11/2003 | Morris et al. .............. 351/169 |
| 2003/0117578 | A1 | | 6/2003 | Haimerl et al. |

OTHER PUBLICATIONS

English translation of International Preliminary Examination Report and Written Opinion of the ISA (eight (8) pages).
German Office Action dated Jul. 14, 2004 (three (3) pages).
International Search Report dated Feb. 4, 2005 including an English translation of the pertinent portion (fourteen (14) pages).

* cited by examiner

INDIVIDUAL EYEGLASS LENS

This invention relates to an individual eyeglass lens and use of an individual eyeglass lens.

There is a trend toward progressive lenses having a short progression. Fashionable glasses have become smaller, prompting many manufacturers to offer progressive lenses with a shortened progressive length. Extensive wearing trials have also shown that eyeglasses are perceived as more pleasant if they do not necessitate lowering one's eyes so greatly when doing "close work," i.e., when reading a book. Slightly raising the head, e.g., when working at a computer, is usually perceived as more pleasant ergonomically.

A lens having a short progression for vision correction may be expected to have approximately the same effect at the centering point or at the far reference point, and it reaches the effect required for "close work" definitely within the edge of the eyeglass frames. Neither the far range nor the near range should be cut off by the frames but instead both ranges should lie within the frames.

To do so, it is important for the distance from the far reference point to the near reference point to be as small as possible.

Specifying the vertical distance from stamp points, e.g., between the far reference point and the near reference point or between the centering cross and/or centering point and/or the near reference point, is not sufficient for characterizing the progressive length of a progressive vision lens.

The term centering point in the sense of the present invention is understood to refer in particular to the point which should preferably coincide with the adaptation point. If there is no prescribed prism or thickness reduction prism or if such prisms have been neutralized, then the prism reference point will correspond to the optical midpoint. This centering cross is preferably located at a position having the coordinates x equal to approximately 0 millimeter and y equal to approximately 4 millimeters. In particular the term centering point is understood to refer to the point as defined in DIN EN ISO 13666:1998. Furthermore, instead of the term centering point, the term centering cross may also be used in the sense of the present invention.

The adaptation point in the sense of the present invention refers in particular to the point on the front surface of an eyeglass lens or a semifinished eyeglass lens product which is to serve as the reference point for the positioning of the eyeglass lens in front of the eye according to the manufacturer's instructions. The adaptation point is defined according to EN ISO 13666:1998.

The term addition in the sense of the present invention refers to the difference between the vertex refractive power of the near part and the vertex refractive power of the far part, measured in particular by defined methods. Addition is defined according to EN ISO 13666:1998.

To further clarify traditional technical terminology such as that used in the present patent application, reference is made here to the relevant standards, in particular DIN EN ISO 19666:1998.

The progressive length should be very short according to the following definition: the length of the progressive zone, i.e., the progressive length corresponds to the difference between the vertical coordinates of two points, whereby one upper point is the point on or directly next to the main line on which there is a power with which the hyperopia is corrected approximately (e.g., the far reference point) and the other lower point is the point on or directly next to the main line of the vision on which the near effect required by the prescription is achieved for the first time by lowering one's eyes. As a rule, this point is not the near reference point. Instead, this point is situated at a distance from the near reference point, on or directly next to the main line in the direction toward the far reference point.

This definition provides a measure of the progressive length which is independent of arbitrary stamped images which takes into account the use situation in which the eyeglass wearer is using the glasses.

In addition, it is extremely important for the change in refractive power to be achieved in the shortest possible distance. This means that the refractive power does not change between the far reference point and the centering cross and the near value is reached shortly above the near reference point.

To do so, a so-called main progressive length may be defined, as already defined in European Patent 0 911 672. This is defined as the quotient of the addition and the maximum slope of the refractive power along the main line.

The design of a progressive lens having a short progressive zone involves a few problems. The trend is that the shorter the progressive zone with the same addition achieved, the narrower it is as well.

This larger central astigmatism gradient is associated with an increased maximum astigmatism in the periphery which reduces the optical quality there. If a negative effect on the imaging properties due to the greater astigmatism must be accepted, then at least the course of the refractive power can be designed to be especially tolerable.

In progressive vision lenses, for example, the effect is achieved at the far reference point in the vertex measurement position or in the use position. In the former case, the lens then has an effect which usually deviates only slightly from the prescription in the use position.

Individual eyeglass lenses have already been described in various patent applications by the present applicant. A progressive lens having a short progressive length has already been described by the patent applicant in a patent application. However, the problems become exponentially greater when the requirement of an individual eyeglass lens is combined with a short progressive length because the progressive surface must also be responsible for the astigmatic power and all other individual parameters. The astigmatism distribution of such a surface differs greatly from that of a normal progressive surface as depicted in FIGS. 1 and 2.

Therefore the object of the present invention is to provide an individual eyeglass lens that has a short progressive zone and takes into account all the individual parameters despite this requirement.

This object is achieved by the individual eyeglass lens as claimed in claim 1 and the use of an individual eyeglass lens as claimed in claim 5.

According to the present invention, an individual eyeglass lens is made available, having an area designed for viewing at greater distances, especially into the infinite, hereinafter referred to as the far part, an area designed for viewing at shorter distances and especially at a reading distance, hereinafter referred to as the near part and a progressive zone situated between the far part and the near part, the effect of the eyeglass lens increasing from the value at the far reference point situated in the far part, hereinafter referred to as the far value, to the value of the near reference point situated in the near part, hereinafter referred to as the near value, along a curve running toward the nose, hereinafter referred to as the main line, whereby the vertical distance from the near reference point to the far reference point amounts to max. 18 millimeters, the progressive length amounts to max. 14 millimeters, the main progressive length amounts to max. 10 millimeters and the increase in refractive power, starting from the effect of the eyeglass lens at the far reference point to a point 2 millimeters below the centering point amounts to less than 10% of the addition and whereby the progressive length corresponds essentially to the vertical distance between the far reference point and a point essentially on the main line, starting from the far reference point, the value corresponding the first time essentially to the value of the effect of the eyeglass lens at the near reference point, i.e., the near value. In other words, the progressive length is essentially the vertical distance between the far reference point and a point essentially on the main line whereby starting from the far reference point the value of the effect of the eyeglass lens essentially corresponds for the first time to the value at the far reference point plus the addition.

The progressive zone is preferably a short progressive zone, i.e., a progressive zone having a progression length of preferably approximately 14 millimeters.

Owing to the short progressive length, the inventive eyeglass lenses may advantageously also be used in fashionable frames.

The term "vertical distance between two point" is understood in the sense of the present invention to refer to the difference between the vertical coordinates, i.e., the y coordinates of the two points.

Furthermore a reading distance preferably refers to a distance of an object from the eyeglass lens between preferably approximately 15 centimeters and approximately 70 centimeters, especially preferably between approximately 20 centimeters and approximately 50 centimeters.

In addition it is preferable for the site of the minimal astigmatism not to be situated on the main line but instead in the periphery, either nasally or temporally, the astigmatism on the main line to amount to no more than 0.5 diopter and the astigmatism with regard to the main line to be distributed completely asymmetrically.

The maximum astigmatism may thus even be on the main line.

Furthermore it is preferable for the surface astigmatism along the main line to amount to more than 0.5 diopter at all points, the vertical distance from the near reference point to the far reference point to be max. 14 millimeters, the progressive length to be max. 12 millimeters, the main progressive length to be max 8 millimeters, the increase in refractive power 3 millimeters below the centering cross to amount to less than 10% of the addition, the addition is reached 2 millimeters above the near reference point and then the refractive power is almost constant, i.e., stable over a length of preferably approximately 3 millimeters, especially preferably approximately 4 millimeters. Stable, i.e., almost constant in the sense of the present invention means that the change in refractive power along the main line is less than preferably approximately 0.2 diopter, especially preferably less than approximately 0.1 diopter over a vertical distance of preferably approximately 3 millimeters, especially preferably approximately 4 millimeters. The refractive power preferably changes by less than approximately 10%, more preferably by less than approximately 5%, especially approximately by less than approximately 3% over a vertical distance of preferably approximately 3 millimeters, especially preferably approximately 4 millimeters.

In addition the present invention includes a use of an individual eyeglass lens for correction of a user's optical vision defect, comprising an area hereinafter referred to as the far part designed for viewing at greater distance, especially into the infinite, an area for viewing at shorter distances, especially at reading distances, hereafter referred to as the near part, and a short progressive zone arranged between the far part and the near part where the effect of the eyeglass lens increases from the value at the far reference point located in the far part, hereinafter referred to as the far value, to the value of the near reference point located in the near part, hereinafter referred to as the near value, along a curve running toward the nose, hereinafter referred to as the main line, whereby the vertical distance from the near reference point to the far reference point is at least 18 millimeters, the progressive length is max. 14 millimeters, the main progressive length is max. 10 millimeters and the increase in refractive power starting from the effect of the eyeglass lens at the far reference point, up to a point 2 millimeters below the centering point amounts to less than 10% of the addition and whereby the progressive length corresponds essentially to the vertical distance between the far reference point and a point essentially on the main line, wherein, starting from the far reference point, the value of the effect of the eyeglass lens the first time corresponds essentially to the value of the effect of the eyeglass lens at the near reference point, i.e., the near value. In other words, the progressive length is essentially the vertical distance between the far reference point and a point essentially on the main line whereby starting from the far reference point, the value of the effect of the eyeglass lens corresponds the first time essentially to the value at the far reference point plus the addition.

In all embodiments, the area with the increase in power is the surface facing the eye.

The present invention is explained in greater detail below on the basis of exemplary embodiments with reference to the drawings but without any restriction on the general inventive idea to which explicit reference is also made with regard to the disclosure of all the inventive details not explained in greater detail in the text.

Figure 1:
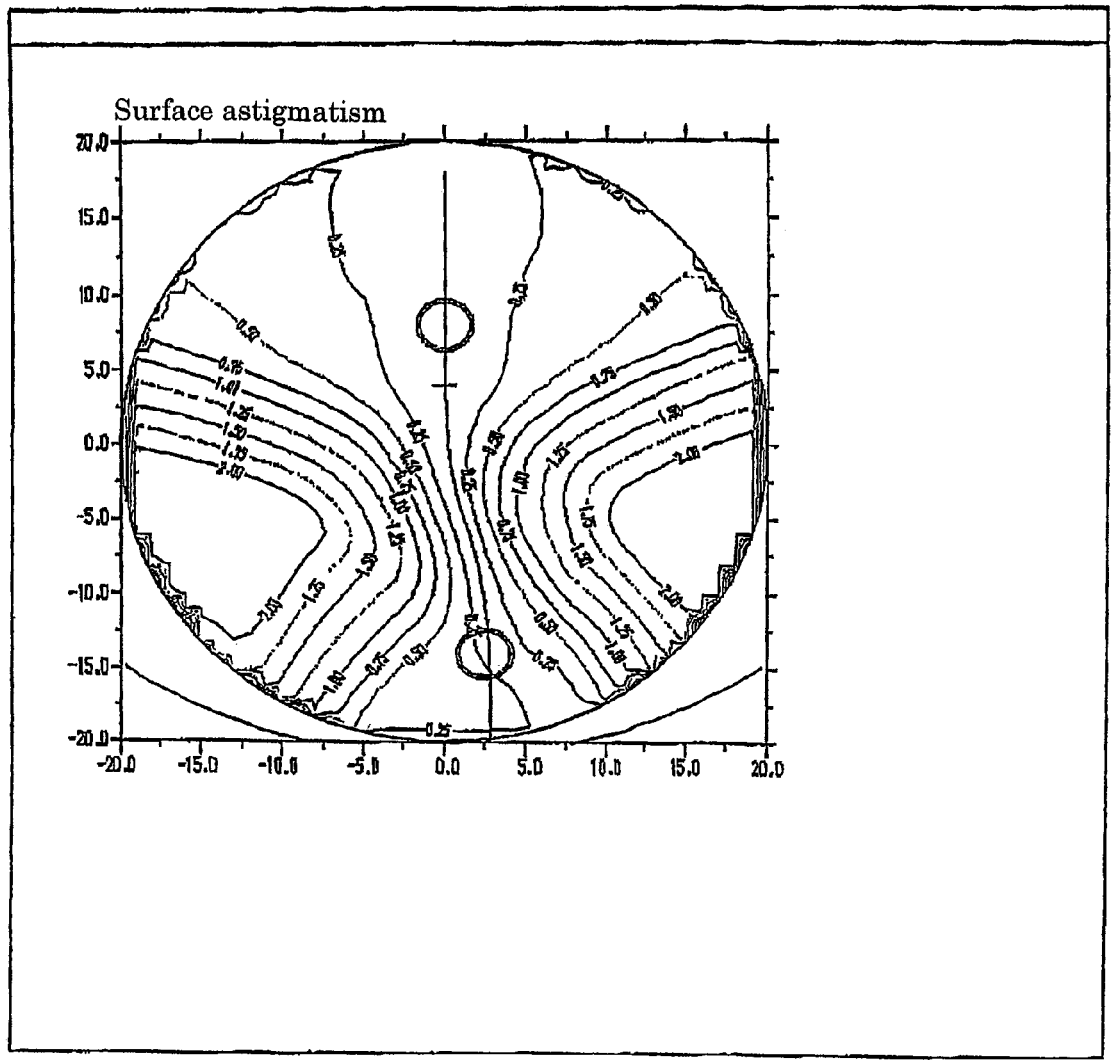
FIG. 1 shows the surface astigmatism according to the state of the art.

As shown in FIG. 1, there is a large far range, progressive range and near range where the astigmatism is less than 0.5 diopter. There are even larger areas where the astigmatism is less than 0.25 diopter.

Figure 2:
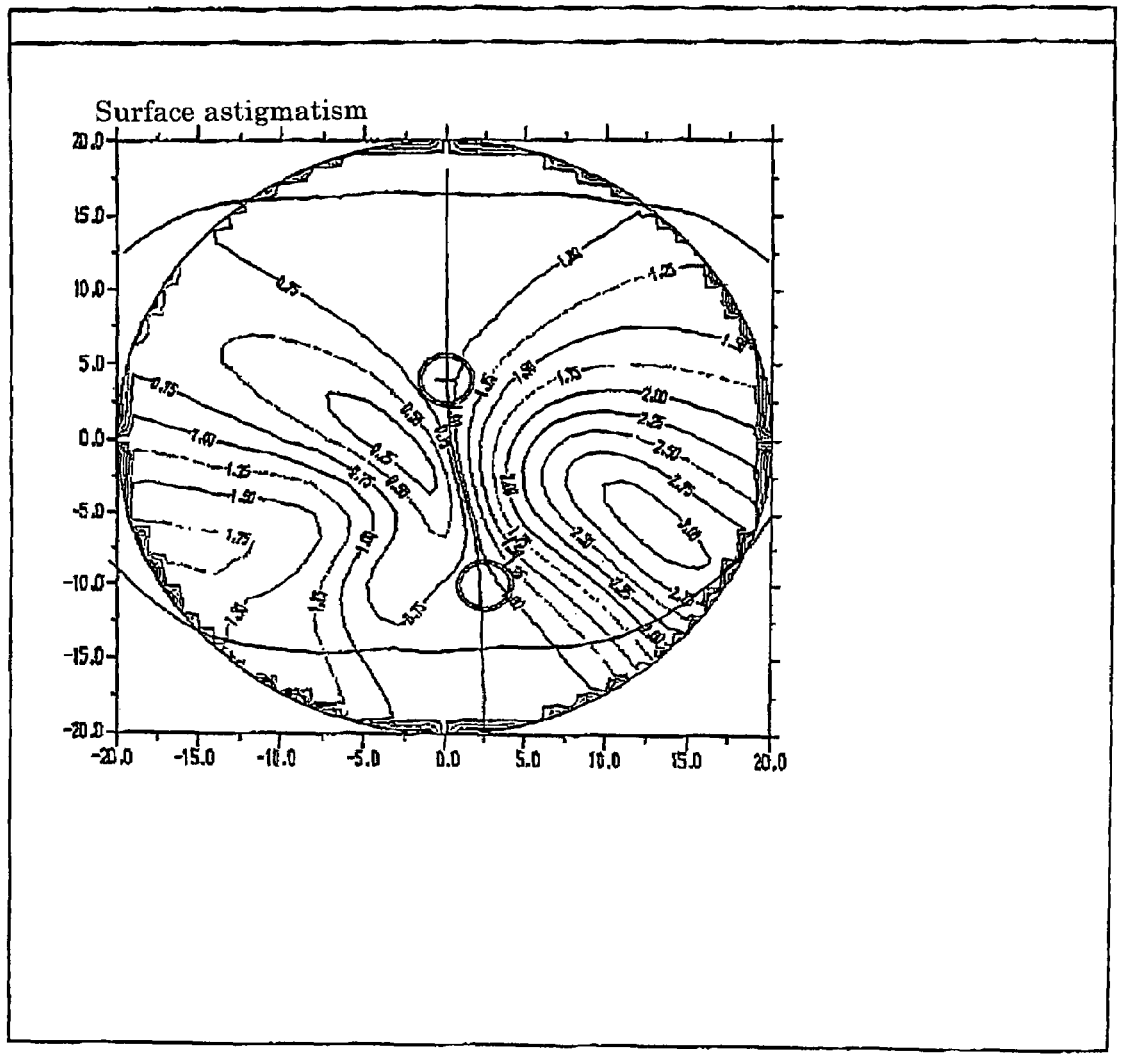
FIG. 2 shows the surface astigmatism according to this invention.

In eyeglass lenses according to the present invention (FIG. 2), such areas can no longer be found. The astigmatism along the main line is always much more than 0.5 diopter. Only in the periphery, when normally the maximum astigmatism occurs does the eyeglass lens according to this invention have the lowest astigmatism (less than 0.25 diopter).

Figure 3:
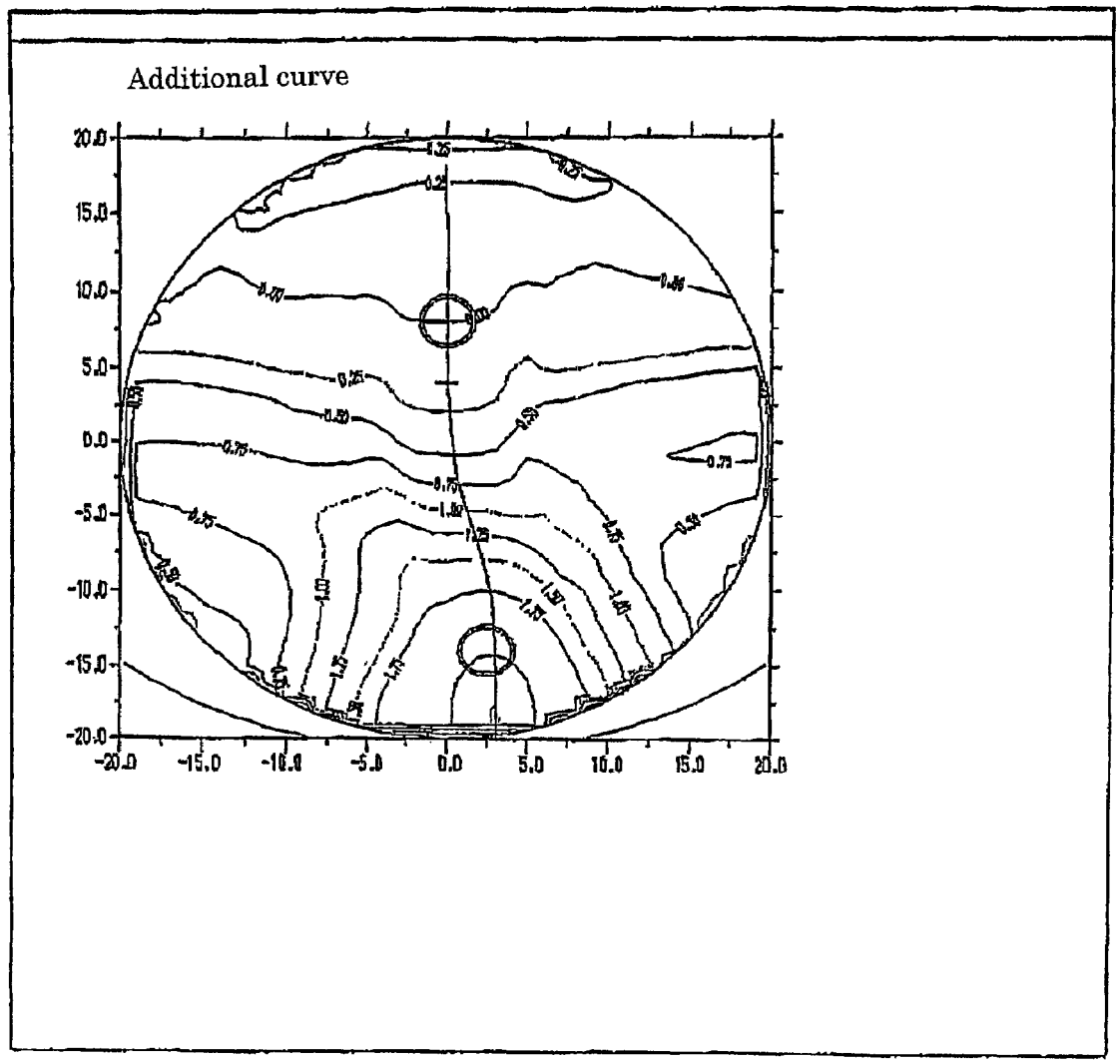
FIG. 3 shows the increase in the average refractive power starting from the far reference point according to the state of the art.
Figure 4:
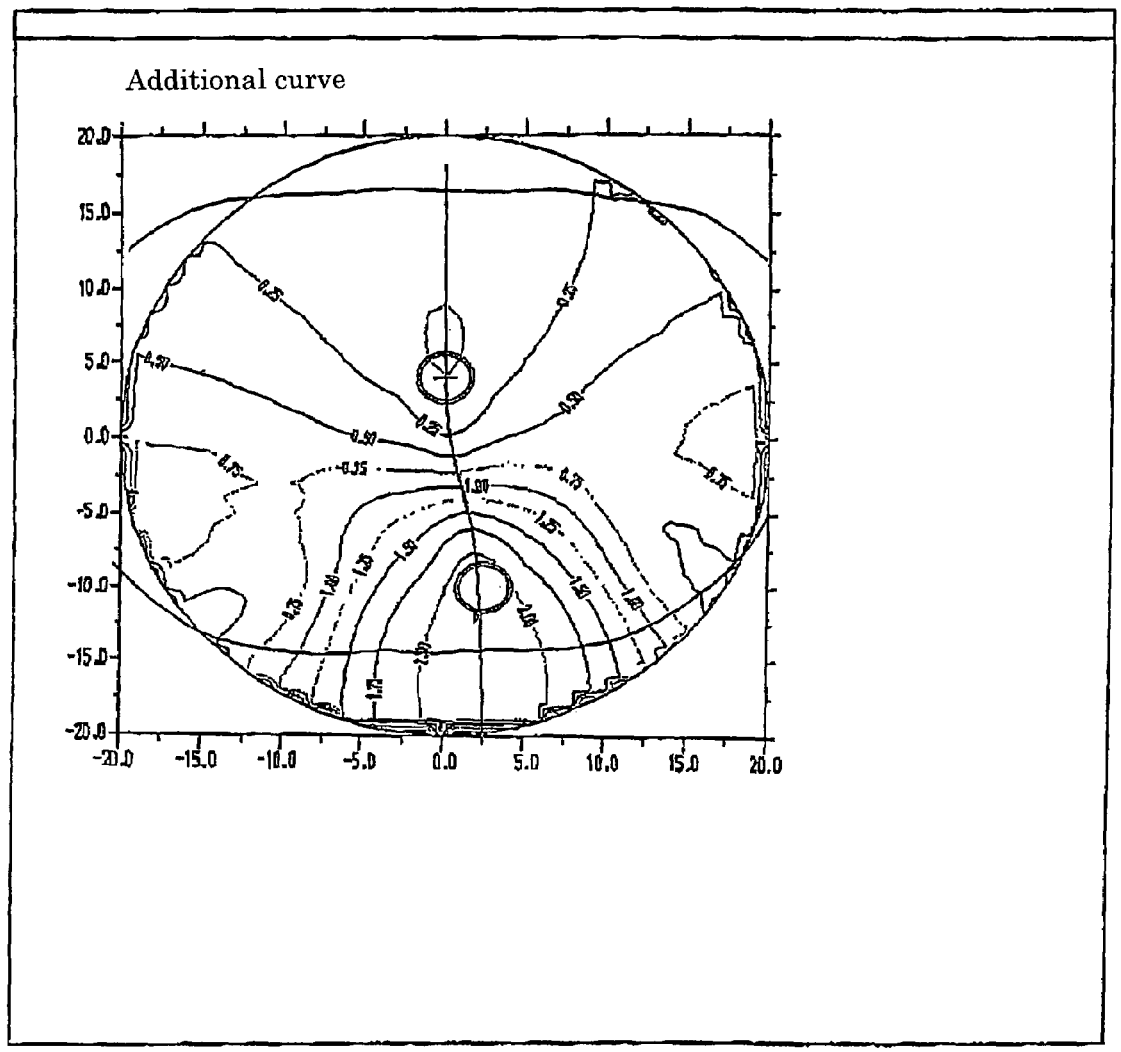
FIG. 4 shows the increase in the average refractive power starting from the far reference point according to this invention.
Figure 5:
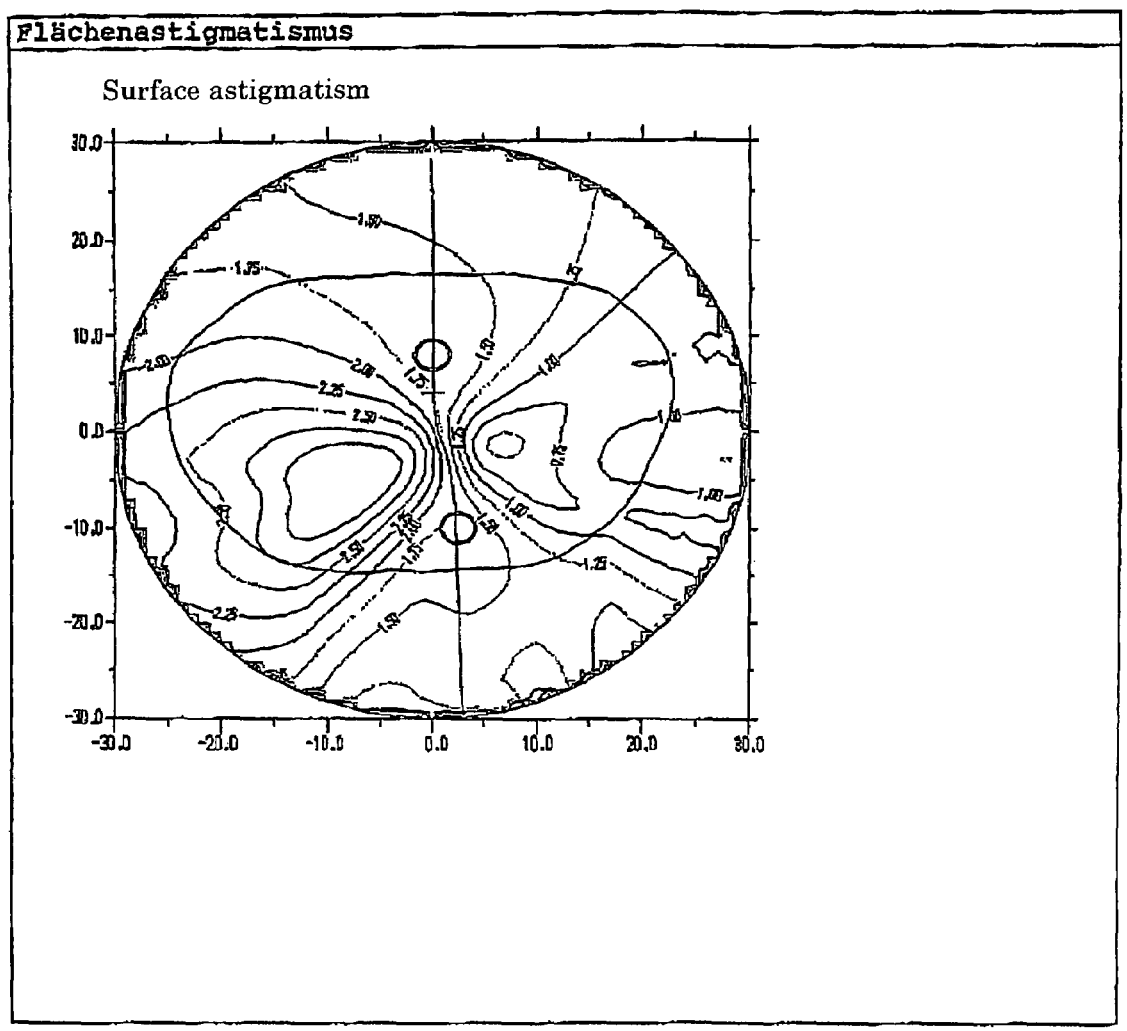
FIGS. 5 through 9 show exemplary embodiments of inventive eyeglass lenses in which the astigmatism is asymmetrically distributed with respect to the main line.
Figure 6:
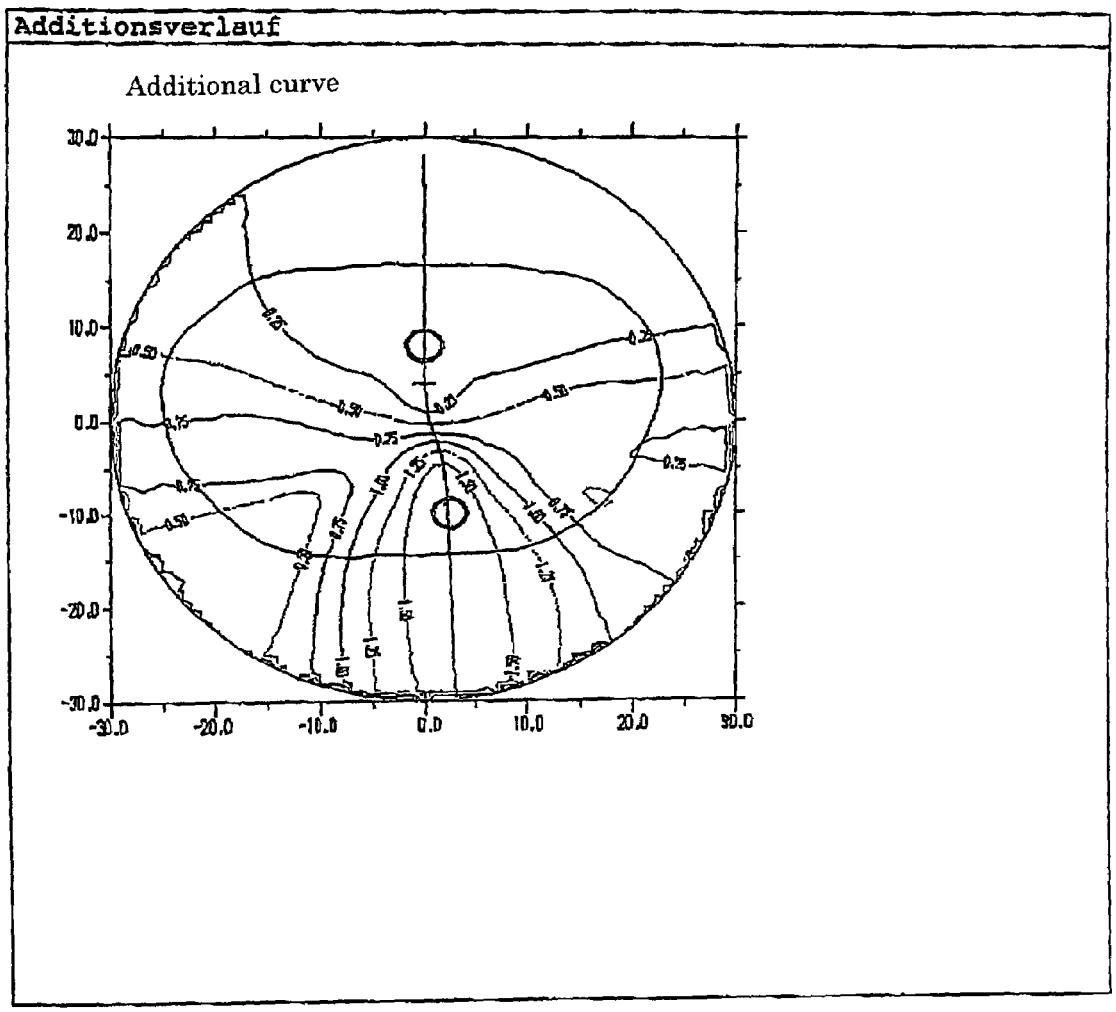
Figure 7:
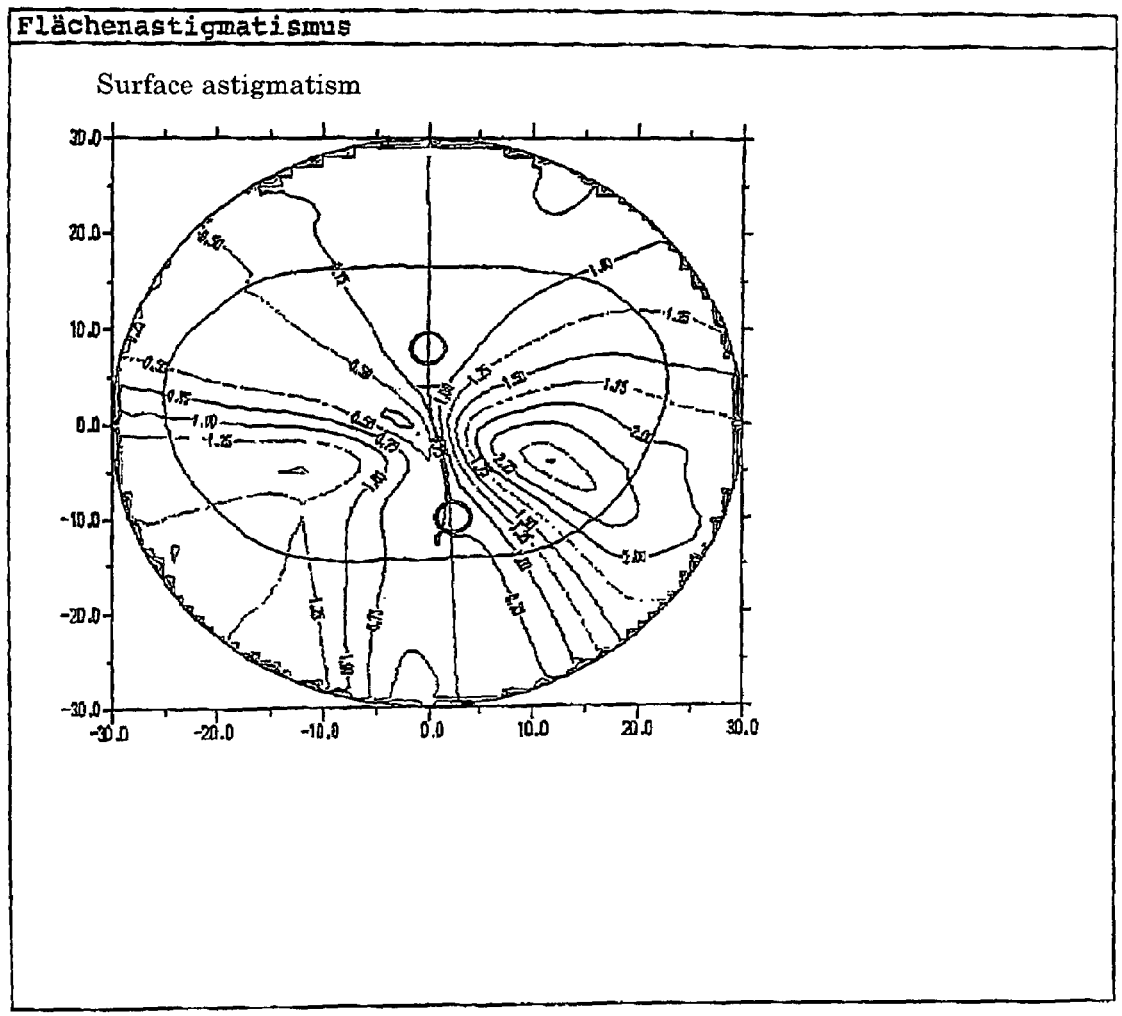
Figure 8:
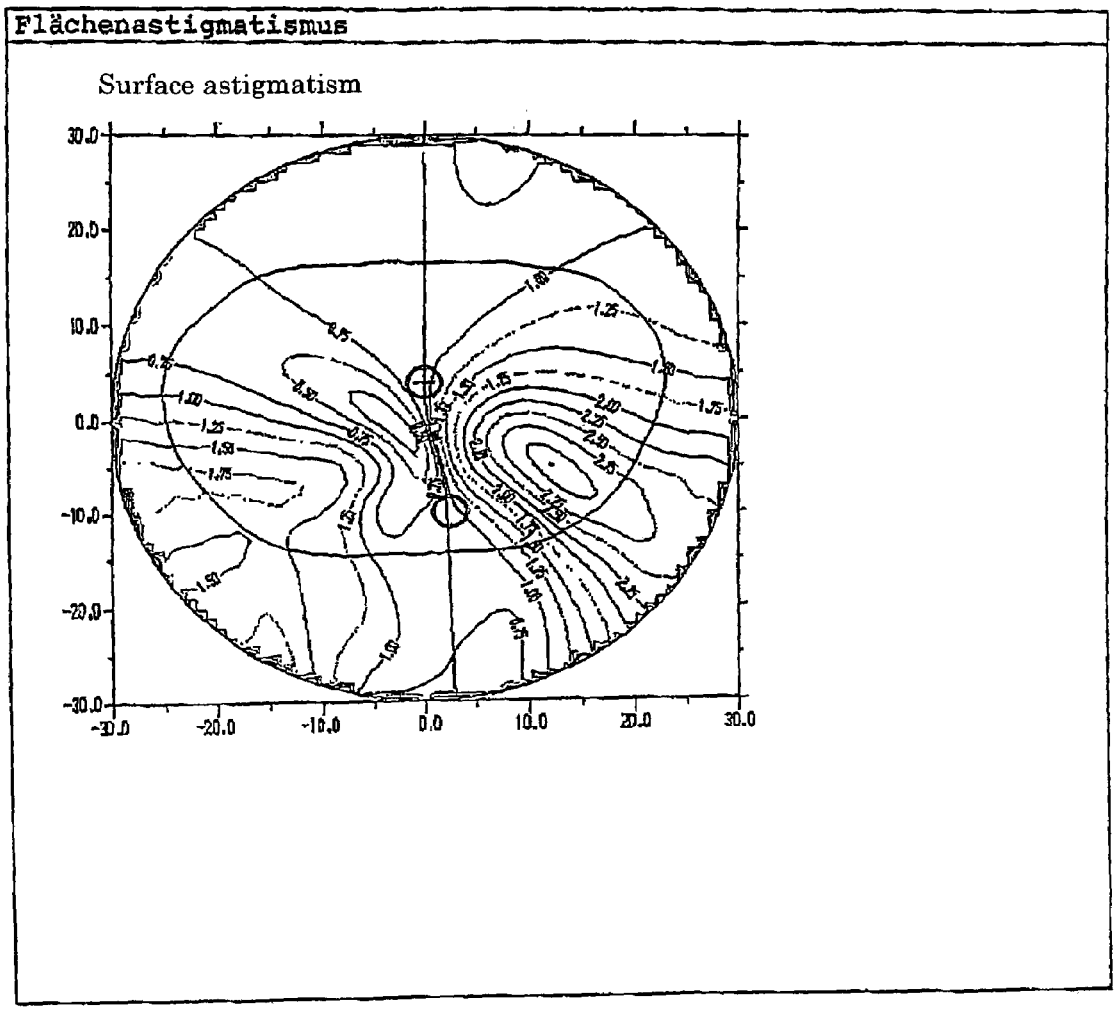
Figure 9:
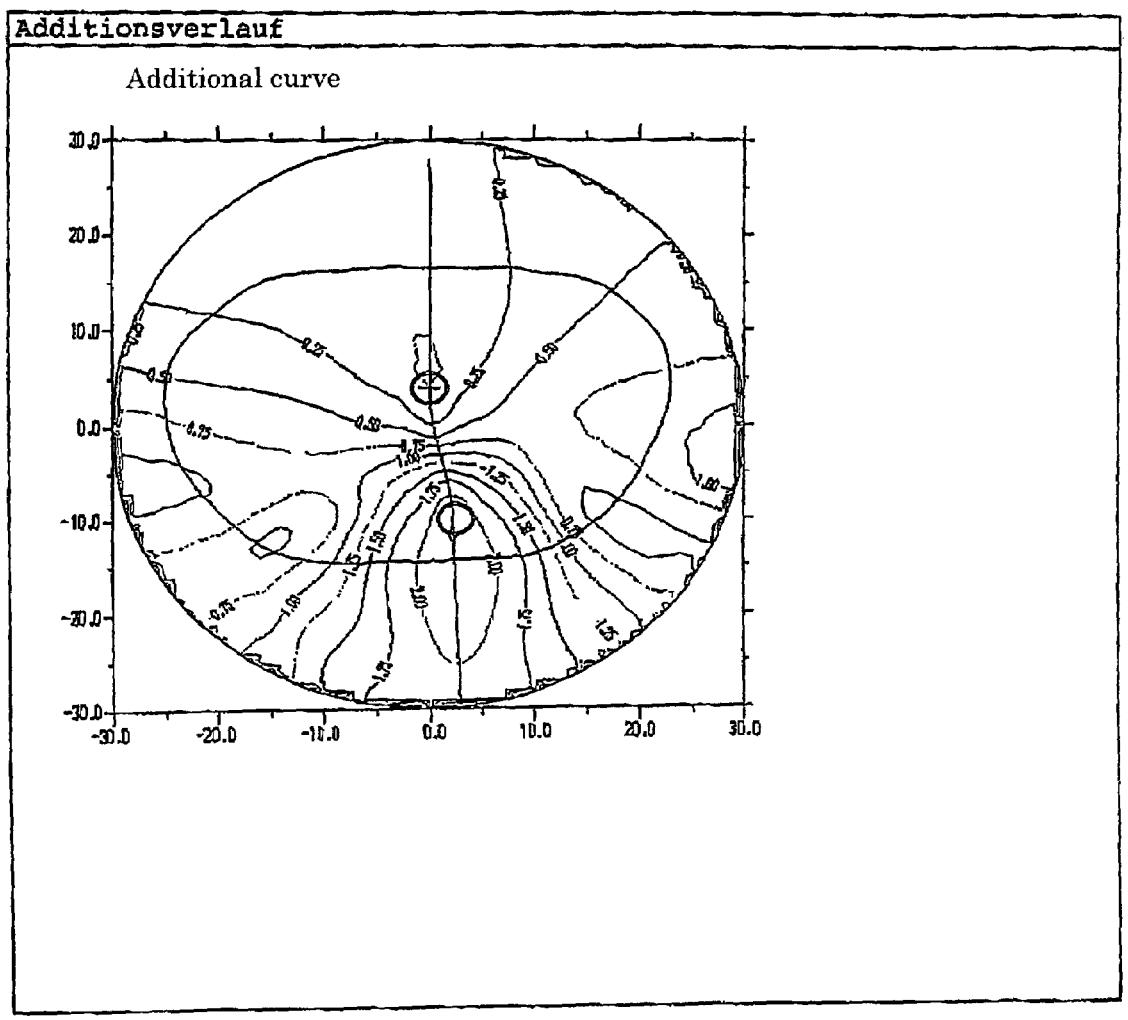

FIGS. 3 and 4 show the increase in average refractive power starting from the far reference point. In the state of the art (FIG. 3), the distance from the far reference point to the near reference point here is 22 millimeters. In the present invention (FIG. 4), it amounts to only 14 millimeters. The progressive length in the state of the art is 22 millimeters, whereas with the present invention it amounts to only 12 millimeters. In the state of the art the refractive power has reached an increase in refractive power of 0.25 diopter already one millimeter below the centering cross, which is at the position where x is equal to 0 millimeter and y is equal to 4 millimeters, whereas with the present invention this is the case only 4 millimeters below the centering cross. The full near effect of 2.0 diopters is reached in the state of the art only at the height of the near reference point, whereas this is already the case 3 millimeters above the centering cross in the present invention. The main progressive length in the state of the art is 13 millimeters and in the present invention is only seven millimeters.

Figure 10:
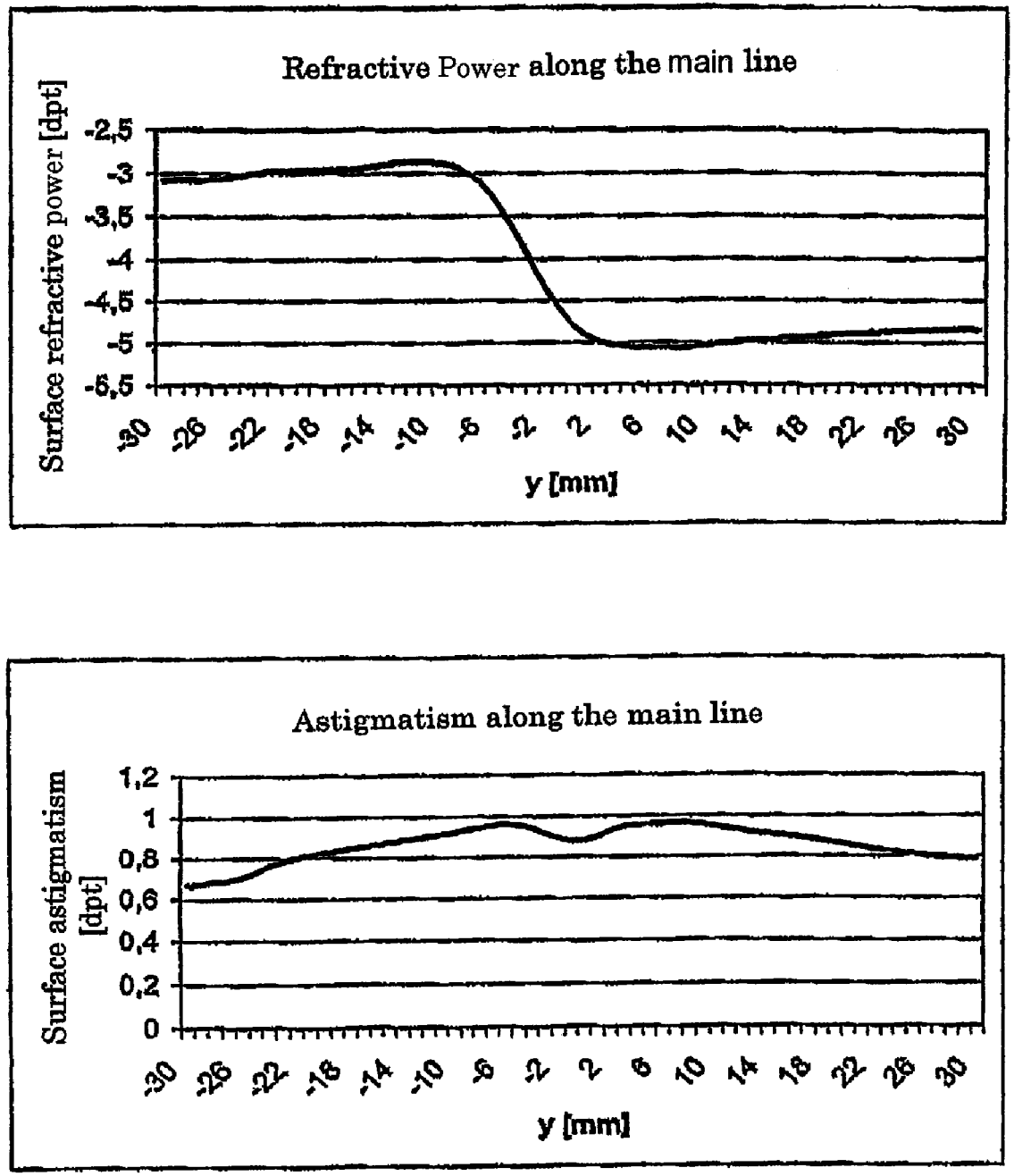
FIG. 10 shows the refractive power and the astigmatism along the main line in an inventive exemplary embodiment.

FIGS. 5 through 9 show other exemplary embodiments of the inventive eyeglass lens in which the astigmatism is asymmetrically distributed with regard to the main line, and FIG. 10 shows the refractive power and the astigmatism amounting to more than 0.5 diopter along the main line of an inventive eyeglass lens. FIG. 10 shows that the refractive power along the main line fluctuates between approximately −2.7 diopters and approximately −3.1 diopters, e.g., in the area where y equal approximately −30 millimeters to y equal approximately −5 millimeters, i.e., a maximum change in refractive power of approximately 0.4 diopter occurs over a vertical extent of approximately 25 millimeters. In other words, the refractive power is essentially stable, i.e., essentially constant over a vertical range of approximately 25 millimeters.

In particular the present invention includes an individual eyeglass lens having
- an area (far part) designed for seeing at greater distances, especially "into the infinite,"
- an area (near part) designed for seeing at shorter distances and especially "reading distances," and
- a short progressive zone situated between the far part and the near part, where the effect of the eyeglass lens increases from the value at the far reference point located in the far part to the value at the near reference point located in the near part along a curve (main line) running toward the nose, whereby
- the vertical distance from the far reference point to the near reference point is max. 18 millimeters,
- the progressive length is max. 14 millimeters,
- the main progressive length is max. 10 millimeters and
- the increase in refractive power up to a point 2 millimeters below the centering cross amounts to less than 10% of the addition.

The invention claimed is:

1. Individual eyeglass lens, comprising
an area designed for seeing at greater distances, in particular into the infinite, hereinafter referred to as the far part,
an area designed for seeing at shorter distances and especially reading distances, hereinafter referred to as the near part, and
a progressive zone arranged between the far part and the near part where the power of the eyeglass lens increases from a value at a far reference point located in the far part, hereinafter referred to as the far value, to a value at a near reference point located in the near part, hereinafter referred to as the near value, along a curve running toward the nose, hereinafter referred to as the main line, whereby
the vertical distance from the near reference point to the far reference point amounts to a maximum value of 18 millimeters,
a main progressive length defined as the quotient of the addition and the maximum slope of the refractive power along the main line, wherein the main progressive length has a maximum value of 10 millimeters and an increase in refractive power, starting from the power of the eyeglass lens at the far reference point up to a point 2 millimeters below the centering point amounts to less than 10% of the addition and a progressive length corresponds essentially to the vertical distance between the far reference point and a point essentially on the main line at which, starting from the far reference point, the value of the power of the eyeglass lens corresponds the first time essentially to the near value, wherein the progressive length has a maximum value of 14 mm.

2. Individual eyeglass lens as claimed in claim 1, wherein
the location of the minimal astigmatism is not on the main line but instead in the periphery, either nasally or temporally,
astigmatism on the main line amounts to more than 0.5 diopter and
the astigmatism is distributed completely asymmetrically with regard to the main line.

3. Individual eyeglass lens as claimed in claim 1 wherein
the surface astigmatism amounts to more than 0.5 diopter at all points along the main line,
the vertical distance from the near reference point to the far reference point is at most 14 millimeters,
the progressive length is at most 12 millimeters,
the main progressive length is at most 8 millimeters,
the increase in refractive power 3 millimeters below the centering point amounts to less than 10% of the addition, the addition being achieved 2 millimeters above the near reference point and
then the refractive power is stable, i.e., almost constant at least over a length of 4 millimeters.

4. Individual eyeglass lens as claimed in claim 1, wherein the surface having the increase in power is the surface facing the eye.

5. Use of an individual eyeglass lens for correcting a user's optical vision defect, comprising
an area designed for seeing at greater distances, especially into the infinite, hereinafter referred to as the far part,
an area designed for seeing at shorter distances and especially reading distances, hereinafter referred to as the near part and
a short progressive zone located between the far part and the near part where the power of the eyeglass lens increases from a value at a far reference point situated in the far part, hereinafter referred to as the far value, to a value at a near reference point located in the near part, hereinafter referred to as the near value, along a curve running toward the nose, hereinafter referred to as the main line, whereby
the vertical distance from the near reference point to the far reference point has a maximum value of 18 millimeters,
a main progressive length defined as the quotient of the addition and the maximum slope of the refractive power along the main line, wherein the main progressive length has a maximum value of 10 millimeters and an increase in refractive power, starting from the power of the eyeglass lens at the far reference point up to a point 2 millimeters below the centering point amounts to less than 10% of the addition and a progressive length corresponds essentially to the vertical distance between the far reference point and a point essentially located on the main line, in which, starting from the far reference point, the value of the power of the eyeglass lens essentially corresponds the first time to the near value, wherein the progressive length has a maximum value of 14 mm.

6. Individual eyeglass lens as claimed in claim 2, wherein the surface astigmatism amounts to more than 0.5 diopter at all points along the main line,
the vertical distance from the near reference point to the far reference point is at most 14 millimeters,
the progressive length is at most 12 millimeters,
the main progressive length is at most 8 millimeters,
the increase in refractive power 3 millimeters below the centering point amounts to less than 10% of the addition, the addition being achieved 2 millimeters above the near reference point and
then the refractive power is stable, i.e., almost constant at least over a length of 4 millimeters.

7. Individual eyeglass lens as claimed in claim 2, wherein the surface having the increase in power is the surface facing the eye.

\* \* \* \* \*